(12) United States Patent
Berggren et al.

(10) Patent No.: US 8,462,609 B2
(45) Date of Patent: Jun. 11, 2013

(54) CARRIER AGGREGATION

(75) Inventors: Fredrik Berggren, Kista (SE); Jaap van de Beek, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 12/972,992

(22) Filed: Dec. 20, 2010

(65) Prior Publication Data

US 2011/0103333 A1  May 5, 2011

Related U.S. Application Data

(63) Continuation of application No. PCT/CN2008/071354, filed on Jun. 19, 2008.

(51) Int. Cl.
*H04J 11/00* (2006.01)
(52) U.S. Cl.
USPC .................... 370/203; 370/331; 370/343
(58) Field of Classification Search
None
See application file for complete search history.

(56) References Cited

U.S. PATENT DOCUMENTS

| | | | |
|---|---|---|---|
| 7,158,475 B1 | 1/2007 | Ikeda et al. | |
| 7,885,631 B2 * | 2/2011 | Yang et al. | 455/312 |
| 8,077,592 B2 * | 12/2011 | Webster et al. | 370/204 |
| 2004/0014548 A1 | 1/2004 | Borbolla Gonzalez | |
| 2004/0214582 A1 * | 10/2004 | Lan et al. | 455/452.2 |
| 2005/0105657 A1 | 5/2005 | Kroeger et al. | |
| 2008/0240275 A1 | 10/2008 | Cai | |
| 2008/0317147 A1 | 12/2008 | Zhang et al. | |

FOREIGN PATENT DOCUMENTS

| | | |
|---|---|---|
| CN | 1883175 A | 12/2006 |
| CN | 101072216 A | 11/2007 |
| CN | 101076005 A | 11/2007 |
| CN | 101136894 A | 3/2008 |
| CN | 101184318 A | 5/2008 |
| EP | 1855403 A1 | 11/2007 |
| EP | 2057799 B1 | 3/2010 |
| JP | H07-283806 A | 10/1995 |
| JP | 2000-269917 A | 9/2000 |
| JP | 2002-319917 A | 10/2002 |
| WO | WO 2006/092852 A1 | 9/2006 |
| WO | WO 2008/118429 A1 | 10/2008 |

OTHER PUBLICATIONS

1st Office Action in corresponding Japanese Patent Application No. 2011-513843 (Nov. 6, 2012).
"R1-081838—Physical Layer Technologies for LTE-Advanced," 3GPP TSG RAN WG1 #53, May 5-9, 2008, 3GPP, Valbonne, France.
"R1-082448—Carrier Aggregation in Advanced E-UTRA," 3GPP TSG RAN WG1 #53bis, Jun. 30-Jul. 4, 2008, 3GPP, Valbonne, France.
Supplementary European Search Report dated (mailed) Nov. 28, 2011, issued in related Application No. 08757763.1-2412, PCT/CN2008071354, filed Nov. 11, 2011, Hauwei Technologies Co., Ltd.

(Continued)

*Primary Examiner* — Alex Skripnikov
(74) *Attorney, Agent, or Firm* — Leydig, Voit and Mayer, Ltd.

(57) ABSTRACT

Carrier aggregation in a radio communication system is disclosed, in which at least two Orthogonal Frequency Division Multiplexing (OFDM) carriers are aggregated, each of the at least two OFDM carriers comprising subcarriers being spaced in accordance with a subcarrier spacing of the radio communication system, transmission on the at least two OFDM carriers being synchronized in time.

14 Claims, 3 Drawing Sheets

OTHER PUBLICATIONS

3GPP Draft: Rev-080020, $3^{rd}$ Generation Partnership Project (3GPP), XP050440959, Framework for LTE-Advanced air-interface technology development, Apr. 1, 2008, 5 pages.

3GPP TSG RAN IMT-Advanced Workshop, REV-080046, Technology considerations for LTE-Advance, Fugitsu, Apr. 7-8, 2008, 3 pages.

TSG-RAN WG1 #53, A discussion on some technology components for LTD-Advanced, Agenda item: 6.2, Doc for: Discussion, Source: Ericsson, Kansas City, MO, May 5-9, 2008, 11 pages.

3PGG TSG RAN IMT Advanced Workshop, XP-002663156 Requirements and Concepts for LTE Advance, Alcatel-Lucent, REV-080044, Mar. 2008, 12 pages.

Dahlman Erik et al., 3G Evolution HSPA and 1-17 LTE for Mobile Broadband, Wider bandwidth and carrier aggregation, XP002619373, Jan. 1, 2008, pp. 543-544.

International Search Report from P.R. China in International Application No. PCT/CN2008/071354 mailed Mar. 19, 2009.

Written Opinion of the International Searching Authority (translation) dated (mailed) Mar. 19, 2009, issued in related Application No. PCT/CN2008/071354, filed Jun. 19, 2008, Huawei Technologies Co., Ltd.

3rd Generation Partnership Project; Technical Specification Group Radio Access Network; Evolved Universal Terrestrial Radio Access (E-UTRA); Base Station (BS) radio transmission and reception (Release 8) 3GPP TS 36.104 V8.1.0 (Mar. 2008).

3rd Generation Partnership Project; Technical Specification Group Radio Access Network; Evolved Universal Terrestrial Radio Access (E-UTRA); Physical Channels and Modulation (Release 8) 3GPP TS 36.211 V8.1.0 (Nov. 2007).

3rd Generation Partnership Project; Discussion on potential requirements for a spectrum aggregation function, 3GPP TSG-RAN WG1 Meeting #43 R1-051369 Seoul, Korea, Nov. 2005.

3rd Generation Partnership Project; UE maximum-bandwidth capability and related issues, TSG-RAN WG1 #44, R1-060587 Denver, USA, Feb. 2006.

3rd Generation Partnership Project; Downlink transmission to support 10 MHz UE reception capability, 3GPP TSG RAN WG1#44bis R1-060916 Athens, Greece, Mar. 2006.

3rd Generation Partnership Project; E-UTRA bandwidth flexibility TSG-RAN WG1 #45R1-061378 Shanghai, China, May 2006.

3rd Generation Partnership Project; DC offset avoidance techniques in E-UTRA uplink and downlink, TAG RAN WG1, R1-061950 Tallinn, Estonia, Aug. 27-Sep. 1, 2006.

3rd Generation Partnership Project; DC sub-carrier and reserved sub-carriers in EUTRA, 3GPP TSG RAN WG1 Meeting #46, R1-062113 Tallinn, Estonia, Aug. 28-Sep. 1, 2006.

3rd Generation Partnership Project; DC carrier, TSG-RAN WG1 #46, R1-062272, Tallinn, Estonia, Aug. 28-Sep. 2006.

3rd Generation Partnership Project; Text Proposal for DC-HSDPA assumptions and standards impact; 3GPP TSG-RAN WG1 Meeting #53, R1-082138 Kansas City, MO, USA, May 5-9, 2008.

3rd Generation Partnership Project; Initial analyses of resource aggregation options, 3GPP TSG-RAN WG4 Meeting #37, R4-051412 Seoul, Korea, Nov. 7-11, 2005.

Search Report in corresponding Chinese Patent Application No. 200880129787.4 (Nov. 2, 2012).

\* cited by examiner

CARRIER AGGREGATION

CROSS-REFERENCE TO RELATED APPLICATION

This application is a continuation of international application No. PCT/CN2008/071354 filed on Jun. 19, 2008, which is hereby incorporated by reference in its entirety.

TECHNICAL FIELD

The invention relates to a radio communication system. In particular, it pertains to carrier aggregation of OFDM (Orthogonal Frequency Division Multiplexing) carriers comprising subcarriers.

BACKGROUND

When constructing new radio communication systems, there is a need for increasing data rates in the system in relation to data rates of preceding radio communication systems. New services are constantly provided, which require higher and higher data rates. Also, in order not to force users of the preceding radio communication system to buy new equipment, such as User Equipments (UEs), every time a new radio communication system or an updated version of an old system is launched, backwards compatibility should preferably be assured in the new or updated radio communication system. This gradual change of equipment requirements also gives the users some time to exchange their equipment.

In this document, embodiments of the invention will be exemplified for the Third Generation Partnership Project Long Term Evolution Advanced (3GPP LTE-Advanced) system, and thus for Advanced E-UTRA, for which discussions within the 3GPP have recently been started. However, the embodiments of the invention are applicable to essentially any system utilizing multicarrier transmission, such as Orthogonal Frequency Division Multiplexing (OFDM) transmission, as is clear for a person skilled in the art.

As discussed within the 3GPP, the LTE-Advanced system should build on backwards compatibility to the Third Generation Partnership Project Long Term Evolution (3GPP LTE) system, and is supposed to meet the International Telecommunication Union (ITU) requirements for the International Mobile Telecommunication Advanced (IMT-Advanced) system. In this document, the term LTE is generally used for denoting Evolved Universal Terrestrial Radio Access/Evolved Universal Terrestrial Radio Access Network (E-UTRA/E-UTRAN). Correspondingly, the term LTE-Advanced is in this document used for denoting Advanced E-UTRA/Advanced E-UTRAN. For the LTE/LTE-Advanced case, as is also specified by 3GPP, backwards compatibility means that LTE User Equipment (UE) should be able to work in the LTE-Advanced system. Correspondingly, here and throughout in this document, "backwards compatible" (or simply "compatible") means that equipment of a legacy system (old system) should be able to work in a new system being defined.

In general, the new system, having higher data rates, e.g. an LTE-Advanced system or the like, should provide the requirements:
  backwards compatibility to a legacy system, e.g. an LTE system or the like,
  low complexity for a transmitter in the new system, e.g. a low complexity LTE-Advanced transmitter, and
  high spectral efficiency.

As was stated above, backwards compatibility should assure that equipment of the legacy system, e.g. an LTE UE device, is functional also in the new system, e.g. the LTE-Advanced system. This is particularly important during the initial stages of the new system, when the fraction of equipment of the new system will be much smaller than the fraction of equipment of the legacy system. For instance, in the initial stages of LTE-Advanced, before most of the users have bought LTE-Advanced equipment, the number of LTE UEs in the system will be higher than the number of LTE-Advanced UEs.

Further, one characterizing feature of the exemplified IMT-Advanced and LTE-Advanced systems is the support of very high data rates, possibly up to 1 Gbps in downlink direction. This will undoubtedly require a very large transmission bandwidth, maybe even up to 100 MHz. For example, LTE currently supports scalable transmission bandwidths up to 20 MHz. Thus, there is a transmission bandwidth problem of providing larger transmission bandwidths for such very high data rates.

For instance, LTE uses OFDM modulation with a fixed subcarrier spacing, which is well suited to provide scalable bandwidth, simply by adding more subcarriers. The smallest time-frequency resources in LTE are denoted resource blocks, each of width 180 kHz and duration of 1 ms. The normal subcarrier spacing in LTE is 15 kHz and the carrier frequency raster is 100 kHz. However, there is also a mode with 7.5 kHz subcarrier spacing. For LTE, larger bandwidths could in principle be facilitated by increasing the number of resource blocks even more. This would however require major changes in the standard specifications, for instance regarding control signalling, as the system according to the standard is designed assuming a limit on the number of resource blocks to 110.

SUMMARY

During the development of LTE, it was initially assumed that the UE minimum maximum-bandwidth capability was 10 MHz. This, however, led to several problems in the system design, and it was finally agreed to assume a 20 MHz UE capability for the transmission bandwidth. Problems included the synchronization- and broadcast channel placement, handover measurements, and the ability for a UE to camp on parts of the system bandwidth.

If LTE-Advanced would be based on a solution having an available system bandwidth being larger than the transmission bandwidth of the LTE UE, i.e. larger than 20 MHz, problems may (re-)appear regarding backwards compatibility, since LTE UEs only have 20 MHz capability. Therefore, another solution is preferred.

Moreover, a larger transmission bandwidth necessitates large contiguous spectrum allocations, which typically are difficult to acquire. An operator may then have to rely on aggregating smaller segments of spectrum, which may not be located contiguously, or even in the same frequency band, in order to maximize the use of his available spectrum. This concept is sometimes referred to as spectrum aggregation. It does not appear reasonable that any granularity or locations of aggregated spectrum segments may be assumed since there, e.g., needs to be corresponding support of the Layer 1/Layer 2 (L1/L2) control signalling. For example, LTE is currently only based on a contiguous transmission bandwidth, which is directly defined by the number of resource blocks used. This number is signalled to the UE. Thus, to use non-contiguous transmission bandwidths being larger than the one the LTE UEs are capable of handling would require modifications and/or extensions in the L1/L2 signalling and would also cause problems in the system design. It is therefore desirable to find another solution.

Thus, there is in prior art a problem being related to how to provide larger transmission bandwidths for the new systems, which provide the above stated requirements compatibility, complexity and spectral efficiency.

Example embodiments of the invention provide carrier aggregation that achieves high spectral efficiency and data rate, while being backwards compatible and being capable of low complexity implementation.

An example feature in accordance with an embodiment of the invention is that OFDM carriers, of which at least one is an extended legacy carrier, are aggregated, while synchronizing the subcarriers and the transmission on the OFDM carriers, such that a high spectral efficiency is achieved. The extended legacy carriers preferably comprise legacy carriers extended by additional subcarriers being added. Thus, both higher data rates and backwards compatibility are achieved by including these extended legacy carriers in the carrier aggregation.

An advantageous embodiment of the invention makes it possible to generate a transmission signal by using one FFT operation, which results in a low complexity transmitter performing the carrier aggregation.

According to an embodiment of the invention, plural aggregated OFDM carriers are transmitted by one and a same transmitter. This is typically most advantageous.

According to an embodiment of the invention, two or more transmitters are involved in transmitting aggregated OFDM carriers. This embodiment is useful, e.g., for handover situations and multipoint transmission, such as transmission diversity, network Multiple Input Multiple Output (MIMO), spatial multiplexing and the like where equipment in the system, such as a UE, receives signals from more than one transmitter.

According to an embodiment of the invention, all of the OFDM carriers being aggregated are extended legacy carriers.

According to an embodiment of the present invention, an extended legacy carrier comprises one or more subcarriers added in order for the extended legacy carrier to become symmetric with respect to a center frequency of the legacy carrier.

According to another embodiment of the present invention, the additional subcarriers are added to the legacy carrier such that the extended legacy carrier becomes asymmetric with respect to a center frequency of the legacy carrier.

These symmetric and asymmetric extended legacy carriers can then be aggregated in different combinations with each other. This results in a very flexible carrier aggregation, and the possibility to adapt the addition of additional subcarriers to the extended legacy carriers such that also asymmetric requirements on out-of-band emissions can be fulfilled. Thus, a carrier aggregation can hereby be achieved, which takes into consideration that more out-of-band emissions can be accepted in some parts of the spectrum, e.g. between the OFDM carriers being aggregated, than in other parts of the spectrum, e.g. at the end side of the aggregated carrier resulting from the carrier aggregation.

According to an embodiment of the invention, the DC subcarriers of the aggregated carrier and/or the extended legacy carriers are excluded from transmission. This reduces the local oscillator leakage problems in a receiver receiving the transmitted signal.

In a specific implementation of the general idea of the embodiments of the invention, the method and apparatus of the invention is preferably implemented in an LTE-Advanced system (corresponding to a general radio communication system), aggregating extended LTE carriers (corresponding to general extended legacy carriers) and/or LTE carriers (corresponding to general legacy carriers) into LTE-Advanced carriers (corresponding to general aggregated carriers).

Detailed example embodiments and advantages of the carrier aggregation according to the invention, inclusive of an example a computer program product implementing processing in accordance with the invention, will now be described with reference to the appended drawings illustrating some preferred embodiments.

DETAILED DESCRIPTION

Figure 1:
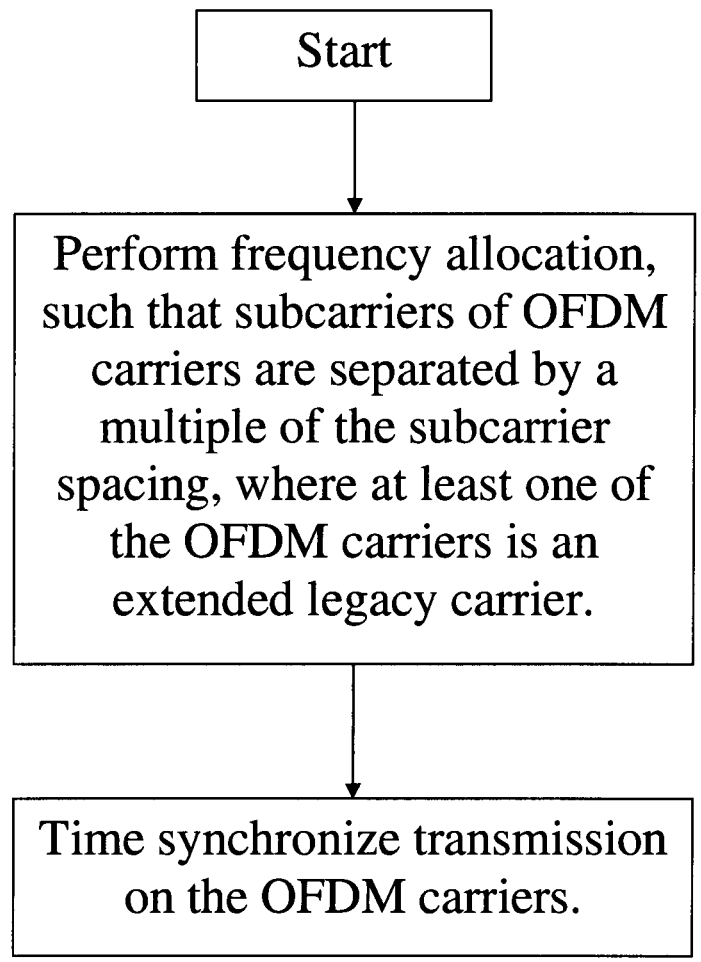
FIG. 1 shows a flow diagram for an embodied method in accordance with the invention.

According to the invention, one technique being referred to as carrier aggregation is used under certain restrictions, which provide backwards compatibility and increased spectrum utilization. This carrier aggregation is, according to the invention, performed on general OFDM carriers, as will be explained below. However, since LTE-Advanced is one of the possible systems in which the invention can be implemented, examples are below also given for the LTE-Advanced implementation.

For the LTE/LTE-Advanced example, when using carrier aggregation according to the invention, the spectrum of LTE-Advanced signal is comprised of aggregated OFDM carriers, of which aggregated OFDM carriers at least one is an extended LTE carrier. Here, and throughout in this document, carrier denotes a set of OFDM subcarriers.

Hence, LTE-Advanced can, according to the invention, be seen as an extension of LTE. Thereby, an LTE UE can access one of the individual OFDM carriers at a time while an LTE-Advanced terminal can transmit and receive on spectrum resources from several OFDM carriers simultaneously. Thus, the LTE-Advanced system is backwards compatible to LTE, while still offering higher bitrates for LTE-Advanced UEs.

For backwards compatibility reasons, it is required that LTE-Advanced also uses the 100 kHz carrier frequency raster, same subcarrier spacing and support for 180 kHz resource blocks. In LTE, different transmission bandwidths are supported by including less or more resource blocks. Currently, LTE supports 1.4, 3, 5, 10, 15 and 20 MHz bandwidths and all LTE UEs have 20 MHz bandwidth capability.

Also, full LTE carriers are the smallest entities that are relevant to aggregate while maintaining reasonable system complexity and overhead. Aggregation being performed based on LTE carriers naturally also result in backwards compatibility. Also, since spectrum is a scarce resource, it would be inefficient to have all OFDM carriers being dedicated just for LTE-Advanced UEs, since not all UEs in the system are LTE-Advance UEs. Hence, LTE access to at least some of the OFDM carriers is desirable.

Generally, in cellular OFDM radio communication systems, significant parts of the spectrum are used as guard bands due to specified limits on out-of-band spectral emissions. For instance, for LTE, a 20 MHz carrier has a transmission bandwidth corresponding to 100 resource blocks, i.e. 18 MHz. Thus, 2 MHz of the channel bandwidth is used as a guard band for suppressing out-of-band emissions. This empty space is needed for assuring that uncoordinated carriers can be deployed 20 MHz apart. However, the guard bands also have an impact on the spectral efficiency of the system. As has been recognized by the invention, within an OFDM system, the subcarriers are orthogonal, which can be utilized to further minimize the guard band between two OFDM carriers, if the two OFDM carriers can be coordinated. This means that the space in the frequency spectrum being used for guard bands can be significantly reduced if the aggregated OFDM carriers have certain characteristics. The OFDM carriers being aggregated should, according to the invention have the following characteristics for their subcarriers. The subcarriers should:
  have the same subcarrier spacing,
  be frequency synchronized, such that the subcarriers are located such that the subcarriers frequencies are separated by a multiple of the subcarrier spacing (and of the carrier frequency raster) and,
  be time synchronized.

Thus, frequencies should be allocated for OFDM carriers being aggregated in a way that their subcarriers are located such that they are separated by a multiple of the subcarrier spacing. Also, transmission on the OFDM carriers should be synchronized in time.

FIG. 1 shows a flow diagram for a method for carrier aggregation of two or more OFDM carriers according to the invention. In the first step, frequency allocation of a spectrum is performed, in a way that the subcarriers of the OFDM carriers are located such that they are separated from each other by a multiple of the subcarrier spacing, i.e. frequency synchronization is performed. In the second step of the method, transmission on the OFDM carriers is synchronized in time. According to the invention, at least one of the OFDM carriers is an extended legacy carrier, which is compatible with a legacy radio communication system. The extended legacy carrier is created by adding one or more additional subcarrier to a legacy carrier, where the additional subcarriers have been added to frequencies of the legacy carrier being used as a guard band in the legacy system.

By the method of carrier aggregation according to the invention, very efficient spectrum utilization is achieved, since frequencies otherwise being used for guard bands are, by adding additional subcarriers to these frequencies, used for transmission of data. This is explained in detail below.

The properties of the method for aggregating the OFDM carriers also assure time-frequency synchronization, such that subcarrier orthogonality, and thereby little subcarrier interference, is achieved. Also, the signal of the aggregated carriers can then be generated in one OFDM block, i.e., by one FFT operation, which results in a low complexity transmitter, having one Radio Frequency (RF) transmitter chain. This is, however, only an issue concerning the implementation of the invention. Thus, that there is no requirement that the transmission signal for the aggregated carriers is in fact generated by one single FFT operation. The only requirement is that they are synchronized.

Further, due to the time-frequency synchronization, the aggregated OFDM carriers can be placed more densely, which is the key to improving the spectrum usage. Preferably, the accuracy of the time synchronization is within a fraction of the duration of the cyclic prefix, in order to achieve high spectrum efficiency.

For example, in LTE-Advanced, the carrier frequencies of the OFDM carriers to be aggregated could be placed on a 300 kHz grid, which assures that these carrier frequencies are separated by an integer number of a 15 kHz subcarriers-spacing, and that the OFDM carrier frequency is on the 100 kHz LTE raster. This is due to that the number 300, mathematically, is the least common multiple of 15 and 100. Hence, 19800 kHz as well as 20100 kHz are eligible spacings between the frequencies of two OFDM carriers.

Figure 2:
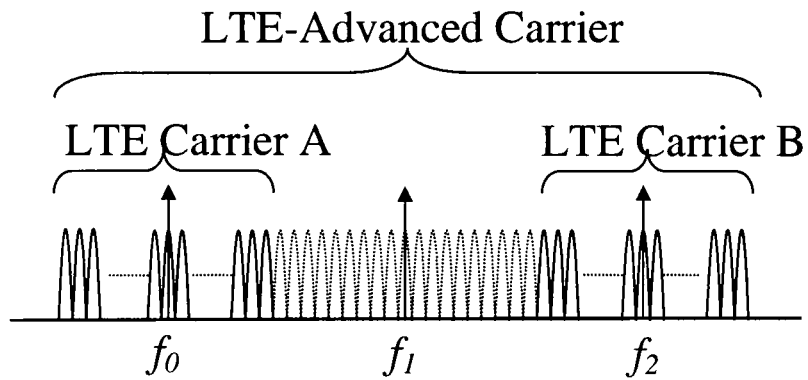
FIG. 2 shows an exemplifying illustration of carrier aggregation.

In FIG. 2 illustrates carrier aggregation, where synchronization in time and frequency is performed. Here the carrier aggregation is illustrated by the use of two LTE carriers, LTE carrier A and LTE carrier B, being aggregated into a LTE-Advanced carrier.

In FIG. 2, the frequency spacing between the two LTE carriers is $f_2-f_0=18.3$ MHz. This is the closest distance the two LTE carriers can be located at without overlapping each other, when being placed on a 300 kHz grid. Here, as is recognized by the invention, since each LTE carrier is 18 MHz wide and the subcarrier spacing is 15 kHZ, there is room for 19 additional subcarriers between the two LTE Carriers. The additional subcarriers are dashed in FIG. 2. Here, all the 19 subcarriers can be used for transmitting additional data. Thus, an idea of the invention is to synchronize LTE carrier A and LTE carrier B in frequency and time, and thereby to achieve transmission of additional data.

Example extended carriers are created, comprising additional time-frequency synchronized resource(s), not excluding extension(s) in code domain. Adding one or more additional subcarriers to a legacy carrier provides example of such resource(s). In accordance with the example, OFDM carriers of which at least one is such an example extended carrier are aggregated synchronized in frequency and time.

However, if the two LTE carriers in FIG. 2 would be independent, e.g. not synchronized, the LTE carrier frequencies must be spaced with 20 MHz and it would not be possible to utilize additional subcarriers while keeping out of band emissions on an acceptable level. Independent LTE carriers are a relevant assumption between different operators. But, a single operator has, on the other hand, the opportunity to synchronize its LTE carriers.

In the example of FIG. 2, having a spacing of 18.3 MHz between the LTE carriers, there is thus at least 1.7 MHz of spectrum resources left of the 20 MHz band of the LTE carrier. The invention recognizes that all or part of this 1.7 MHz wide spectrum could be utilized for transmission of data, which is, of course, advantageous.

The illustrative LTE situation of the invention explained hereafter applies to essentially any new OFDM system (here corresponding to the LTE-Advanced system) aggregating extended legacy carriers (here corresponding to extended LTE carriers) of a legacy system (here corresponding to the LTE system) by adding additional subcarriers to legacy carriers (corresponding to LTE carriers) and aggregating them.

According to the carrier aggregation method of the invention, at least two OFDM carriers are aggregated, of which at least one is an extended legacy carrier. Thus, also more than two OFDM carriers can be aggregated, and all of the OFDM carriers being aggregated do not have to be extended legacy carriers. Thus, the method of the invention is also applicable for aggregation of any number of OFDM carriers, of which one or more are extended legacy carriers, and of which one or more can also be non-extended legacy carriers.

The time-frequency synchronization according to the invention results in a possibility to increase the spectrum efficiency by adding additional subcarriers to frequencies that originally were intended for guard bands. Hence, an extended legacy carrier (in the LTE example being an extended LTE carrier), is created by adding one or more additional subcarrier to a legacy carrier (in the LTE example being a LTE carrier). This results in higher data rates for the transmission.

The equipment of the new system (LTE-Advanced UEs) may here use all the subcarriers of the extended carrier, whereas equipment of the legacy system (LTE UEs) only can use the subcarriers corresponding to the original legacy carrier (the LTE carrier). Also, the equipment of the new system, may use more than one OFDM carrier, e.g. all the OFDM carriers being aggregated, while the equipment of the legacy system may only use one of the OFDM carriers being aggregated. Thus, the extended legacy carriers, each including a legacy carrier and additional subcarriers, achieve backward compatibility to the legacy system as well as improved spectrum efficiency.

A legacy carrier (LTE carrier) is implicitly defined by its carrier frequency, channel structures, reference symbols etc., which are all features that guarantee the function of an LTE UE. Additional subcarriers being added to the LTE carrier to constitute the extended LTE carrier, however, do not necessarily have to support these LTE features. Instead, these additional subcarriers may be utilized for LTE-Advanced specific features and designs. Thus, a LTE UE may not be able to interpret the additional subcarriers of the extended LTE carrier. But the LTE UE is still able to work in the LTE-Advanced system, since it can interpret the LTE part of the extended LTE carriers.

Generally, according to the invention, the LTE carrier (i.e. the legacy carrier) is a part of the extended LTE carrier (i.e. the extended legacy carrier resulting from the addition of additional subcarriers to the legacy carrier), regardless of the size (bandwidth) of the LTE carrier and of the extended LTE carrier. Thus, extended LTE carriers are compatible with the LTE system, such that the LTE UE can work in the LTE-Advanced system.

According to an embodiment of the invention, additional subcarriers for LTE-Advanced are typically added to the left of LTE carrier A and to the right of LTE carrier B in FIG. 2.

In an LTE context, the smallest defined frequency resource is the 180 kHz resource block. It may happen that the spectrum band, for which it is possible to allocate additional subcarriers, is not a multiple of 180 kHz in width. Also, fractional resource blocks are allowed, which make it possible to utilize all of the available spectrum bands for subcarrier allocation also if the spectrum bandwidth is not a multiple of 180 kHz.

Specifically, a baseband signal of an OFDM symbol defined for the time interval $-T_{g_s} \leq t < T_s$ of a legacy carrier, where $T_{g_s}$ is the guard time and $T_s$ is the symbol time, can be generated as:

$$s(t) = \sum_{k \in I_L} X_k e^{j2\pi \frac{k}{T_s} t}, \quad \text{(Equation 1)}$$

where $I_L$ is the index set of subcarriers of the legacy carrier, and $X_k$ are modulation symbols, determined according to the legacy system (e.g. LTE).

For the extended legacy carrier, the signal is generated as:

$$s(t) = \sum_{k \in I_L \cup I_E} X_k e^{j2\pi \frac{k}{T_s} t}, \quad \text{(Equation 2)}$$

where $I_E$ is the index set of additional subcarriers and $X_k$ are modulation symbols, which for $k \in I_E$ are not necessarily determined according to the legacy standard. It is also required that the additional subcarriers are disjoint to the set of subcarriers of the legacy carrier, i.e., $I_L \cap I_E = \phi$.

Further, according to different embodiments of the invention, the extended legacy carrier may be symmetric or asymmetric with respect to a center frequency of the legacy carrier. In this document an extended legacy carrier is regarded as being symmetric with respect to a center frequency of the corresponding legacy carrier if the number of subcarriers to the left and right of the center frequency of the legacy carrier in a frequency spectrum is the same. Correspondingly, a carrier is regarded as being asymmetric with respect to a center frequency of a legacy carrier if the number of subcarriers to the left and right of the center frequency of the legacy carrier in a frequency spectrum is not the same.

Figure 3:
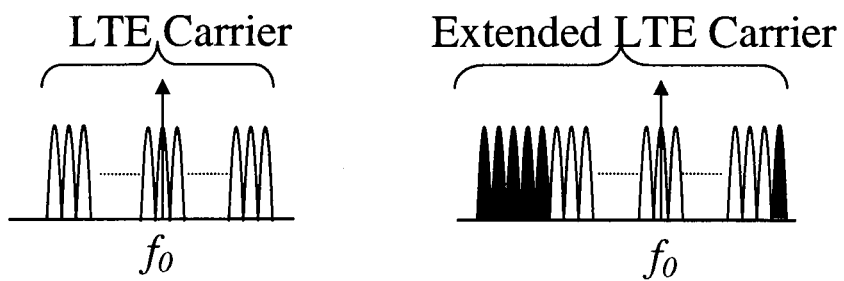
FIG. 3 shows an exemplifying illustration of an asymmetric extended legacy carrier.

In FIG. 3, one example of an asymmetric extended legacy carrier, according to an embodiment of the invention, is illustrated. The added additional subcarriers (colored black in FIG. 3), that are dedicated for LTE-Advanced purposes, are here added asymmetrically around the center frequency $f_0$ of the legacy carrier, resulting in an asymmetric extended legacy carrier.

Figure 4:
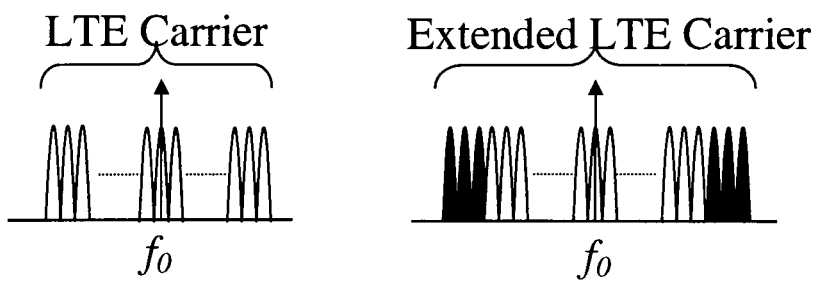
FIG. 4 shows an exemplifying illustration of a symmetric extended legacy carrier according to an embodied method of the invention.

FIG. 4 depicts an extended legacy carrier, according to an embodiment of the invention, which is symmetric with respect to a center frequency of the legacy carrier. Additional subcarriers are here colored black.

Further, according to an embodiment of the invention, these extended legacy carriers are then used as constituent carriers for the carrier aggregation. Thus, it is the extended legacy carriers that must be synchronized in time and frequency and for which the subcarriers must be properly placed to the grid of carrier frequencies.

Figure 5:
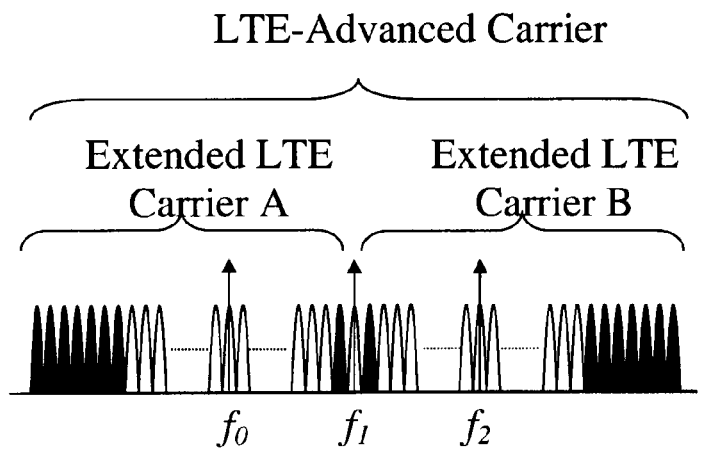
FIG. 5 illustrates carrier aggregation of asymmetric extended legacy carriers according to an embodied method of the invention.
Figure 6:
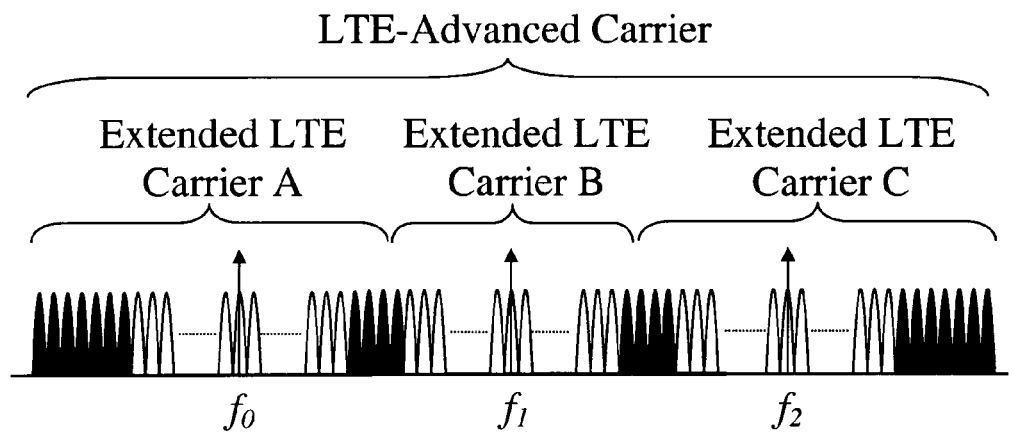
FIG. 6 illustrates example carrier aggregation of a mixture of symmetric and asymmetric extended legacy carriers.

FIGS. 5 and 6 illustrates carrier aggregation according to the present invention for the non-limiting example where the legacy system is a LTE system and the new OFDM system is a LTE-Advanced system. Additional subcarriers are here colored black.

In FIGS. 5 and 6, all OFDM carriers are extended LTE carriers. However, as was stated above, not all of the OFDM carriers have to be extended LTE carriers. According to the invention, it is enough that at least one of the OFDM carriers being aggregated is an extended LTE carrier. Also, the OFDM carriers should be synchronized in frequency and time in order to achieve the advantages of the invention.

Also, according to an embodiment of the invention, a mixture of symmetric and asymmetric extended legacy carriers is aggregated in the carrier aggregation. This is illustrated in FIGS. 5 and 6.

In FIG. 5, two asymmetric extended LTE carriers are aggregated to form a symmetric LTE-Advanced carrier.

In FIG. 6, two asymmetric extended LTE carriers are aggregated with one symmetric extended LTE carrier to form a LTE-Advanced carrier.

The size (i.e., bandwidth) of the legacy carrier is assumed to be known to the UE. For example, in LTE, the number of available resource blocks is signaled to the UE through a broadcast channel. An LTE-Advanced UE also has to know its configured transmission bandwidth, i.e., the bandwidth configuration of the respective extended LTE carrier. This is, according to an embodiment of the invention, achieved by setting up predefined rules for allowed carrier extensions, and also for the configuration of the aggregated carrier resulting from the carrier aggregation. These rules are thus, according to this embodiment of the invention, known by the receiver of aggregated carrier, e.g. by the UE.

According to another embodiment of the invention, informing the receiver, e.g. a UE, of the configuration of the aggregated carrier is achieved by signaling information being related to this bandwidth configuration to the receiver.

For both downlink and uplink transmission, a node in the network, e.g. a eNodeB makes the decisions about how the carrier aggregation should be configured. This configuration is then, as stated above, either known by the equipment in the system, e.g. a UE, or is signaled to the equipment, such that the equipment can receive and/or transmit carriers being aggregated in accordance with this configuration.

According to an embodiment of the invention, the configuration of the carrier aggregation is different for the downlink and the uplink. Thus, the carrier aggregation being used for the downlink does not have to be identical to the carrier aggregation being used for the uplink. This gives the system flexibility, which could be very useful when adapting the transmission in the downlink and uplink to the often differing data rate needs for downlink and uplink transmission. Also, the complexity requirements are much more important for the UE, regarding both baseband and RF implementations. It is therefore advantageous to be able to use an uplink configuration resulting in less UE complexity.

According to an embodiment of the invention, Direct Current (DC) subcarriers of carriers are not used for transmission due to local oscillator leakage. Thus, DC subcarriers of a baseband equivalent representation for these carriers are not transmitted for the extended legacy carriers or for the aggregated carrier resulting from the carrier aggregation. To not transmit these DC subcarriers has the advantage of mitigation of the detection problems due to oscillator leakage in a receiver receiving the transmitted signal. For LTE/LTE-Advanced example, the frequencies $f_2$ and $f_0$ in FIG. 1 are, according to this embodiment, not used in the downlink. Also, for the same reasons, transmission is excluded on frequency $f_1$, which is the center frequency of the LTE-Advanced carrier. This makes it possible to generate the LTE-Advanced carrier from one single FFT, which has a positive effect on the transmitter complexity. To be able to use only one FFT operation keeps the implementation complexity low and makes it is possible to use only one Radio Frequency (RF) chain in the transmitter. Hence, in FIG. 1, when not using the DC subcarrier, there would be 18 free subcarriers that may be utilized for additional subcarrier transmission.

Also, the center frequency of the LTE-Advanced carrier $f_1$ may become located off the 100 kHz raster. The consequence of this is that the UE will not detect the LTE-Advanced Carrier itself, as a UE only searches carrier frequencies on the 100 kHz raster. However, since both $f_0$ and $f_2$ are on the carrier frequency raster, access to the LTE-Advanced Carrier can be made through any of the LTE Carriers, which each contain acquisition channels. Thus, this will not be a problem in the system.

According to an embodiment of the invention, the carrier aggregation method is performed in a downlink transmitter and is used for downlink transmission. Thus, OFDM carriers are here aggregated in a node serving equipment in the system. For a cellular system, such as, for example, a LTE-Advanced system, the ODFM carriers are aggregated in a base station, such as a eNodeB, and the aggregated carrier is transmitted to a mobile station, such as a UE, in the system.

According to an embodiment of the invention, for downlink transmission, the aggregated carrier is aggregated from two or more OFDM carriers being transmitted from two or more transmitters. Thus, carrier aggregation is performed on carriers being transmitted from different transmitters, and where the transmissions of the two transmitters are synchronized in time. For example, in an LTE-Advanced example, one OFDM carrier being transmitted from a first eNodeB is aggregated with a second OFDM carrier being transmitted from a second eNodeB. This can be very useful in, for example, a handover situation, when a UE is receiving signals being transmitted from two transmitters, e.g. from a serving cell transmitter and a target cell transmitter. According to this embodiment of the invention, the signal being transmitted from the serving cell includes at least one OFDM carrier, and the signal being transmitted from the target cell includes at least one OFDM carrier, whereby the OFDM carriers from these two cells are aggregated.

According to an embodiment of the invention, the carrier aggregation method is performed in an uplink transmitter and is used for uplink transmission. Thus, OFDM carriers are here aggregated in equipment, such as a UE, in the system and the aggregated carrier is used for transmission to a node, such as a eNodeB, in the system.

Further, as partly being stated above, according to an embodiment of the invention, all of the OFDM carriers being aggregated in the carrier aggregation are extended legacy carriers, e.g. extended LTE carriers. This results in high data rates.

Also, according to an embodiment of the invention, at least one of the OFDM carriers being aggregated is a legacy carrier, i.e. a non-extended legacy carrier, such as a normal LTE carrier. This makes it possible to achieve a flexible adaption of the carrier aggregation to the differing needs for data rates and compatibility in the system.

According to an embodiment of the invention, one or more of the additional subcarriers are nulled, i.e. are not used for transmission. By having at least one of the additional subcarriers nulled, the risk for having to adjust filters in the reception chain in a receiver receiving the transmitted signal is reduced. Thus, nulling at least one additional subcarrier has advantages for the filter design in the receiver, e.g. in the UE.

Further, the carrier aggregation according to the invention is also applicable on precoded OFDM techniques, such as Single Carrier Frequency Division Multiple Access (SC-FDMA). In SC-FDMA systems, the term $X_k$ in equation 1 corresponds to precoded modulation symbols.

In general, the different steps of the method of the invention described above can be combined or performed in any suitable order. A condition for this of course, is that the requirements of a step, to be used in conjunction with another step of the method of the invention, in terms of allocation of frequencies, frequency and time synchronization, carrier aggregation etc., must be fulfilled.

Also, the method of the invention can implemented by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Figure 7:
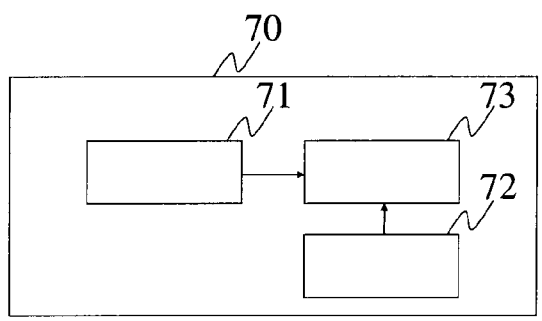
FIG. 7 illustrates schematically an example transmitter and (sub-) system in accordance with the invention.

Further, the method of the invention can also be implemented in one or more transmitters (70) being arranged for performing the steps of the method of the invention as schematically illustrated in FIG. 7. Such a transmitter includes an allocation entity (71), a synchronization entity (72), and a transmission entity (73). The allocation entity (71) is arranged for assisting in allocation of frequencies in a spectrum for the subcarriers of the OFDM carriers being aggregated. Frequencies are allocated such that the subcarriers of the OFDM carriers are located separated from each other by a multiple of said subcarrier spacing. The synchronization entity is arranged for assisting in synchronization of the transmissions on the OFDM carriers in time. The transmission entity is arranged for assist in transmission of the aggregated OFDM carriers. As was stated above in connection with the method of the invention, at least one of the OFDM carriers is here an extended legacy carrier being compatible with a legacy radio communication system. This extended legacy carrier is created by adding at least one additional subcarrier to a legacy carrier the legacy radio communication system.

According to an embodiment of the invention, one transmitter is arranged for performing the carrier aggregation by itself. Then, the allocation entity is arranged for allocating subcarriers for all of the OFDM carriers being aggregated. Also, the synchronization entity and the transmission entity are arranged for synchronizing and transmitting all of the OFDM carriers being aggregated.

According to an embodiment of the invention, the transmitter is used for downlink transmission, and is located in e.g. an eNodeB in a LTE-Advanced system. In this document, eNodeB is used for denoting a node in the LTE-Advance system, having essentially the corresponding functionality as eNodeB in the LTE system, i.e. working as a base station.

According to an embodiment of the invention, the transmitter is used for uplink transmission and is located in e.g. a UE.

Further, according to an embodiment of the invention, for the case of downlink transmission, where OFDM carriers from at least two different transmitters are aggregated, the transmitter is arranged for taking part in this carrier aggregation. A transmitter according to this embodiment of the invention differs from the above described transmitter in that it includes a synchronization entity, which is arranged for synchronizing transmission on the at least one OFDM carriers being transmitted from the transmitter in time with transmission on at least one other OFDM carrier being transmitted by at least one other downlink transmitter. The transmitted further has an allocation entity being arranged for allocating subcarrier frequencies for the at least one OFDM carrier being transmitted from the transmitter. The transmitter also includes a transmission entity, which is arranged for transmitting the OFDM carrier it provides for the carrier aggregation.

The invention also involves a radio communication system, which operates with an aggregated carrier being created by the carrier aggregation of the invention being described above. The radio communication system includes an allocation entity (71) and a synchronization entity (72). The allocation entity (71) is here arranged for assisting in allocation, in accordance with the method of the invention, of subcarrier frequencies for the OFDM carriers being aggregated. The synchronization entity (71) is arranged for assisting in synchronization of transmission on these OFDM carriers in time.

The above described transmitters of the invention can be adapted to perform any of the steps of the method of the invention.

The methods and apparatus for carrier aggregation according to the invention may be modified by those skilled in the art, as compared to the exemplary embodiments described above.

We claim:

1. Method for carrier aggregation of at least two Orthogonal Frequency Division Multiplexing (OFDM) carriers in a radio communication system, each of said at least two OFDM carriers comprising subcarriers being spaced in accordance with a subcarrier spacing of said radio communication system, respectively, the method comprising:
    allocating frequencies in a spectrum, such that the subcarriers of said at least two OFDM carriers are located separated from each other by a multiple of said subcarrier spacing, and
    synchronizing transmission on said at least two OFDM carriers in time,
    wherein at least one of said at least two OFDM carriers is an extended legacy carrier being compatible with a legacy radio communication system, said extended legacy carrier being a legacy carrier of said legacy radio communication system, to which legacy carrier at least one additional subcarrier has been added;
    wherein an aggregated carrier resulting from the carrier aggregation is used for downlink transmission in the radio communication system;
    wherein said at least two OFDM carriers are transmitted from at least two different transmitters;
    wherein, in a handover situation, said at least two OFDM carriers include at least one OFDM carrier being transmitted from a serving cell transmitter and at least one OFDM carrier being transmitted from a target cell transmitter.

2. Method according to claim 1, wherein all of said at least two OFDM carriers are transmitted from a single transmitter.

3. Method according to claim 1, wherein an aggregated carrier resulting from the carrier aggregation is used for uplink transmission in the radio communication system.

4. Method as claimed in claim 3, wherein information being related to a configuration of said aggregated carrier to be used for the uplink transmission is signaled to or known by an uplink transmitter in said radio communication system.

5. Method according to claim 1, wherein said at least one additional subcarrier is added to at least one group of frequencies of said legacy carrier, said at least one group of frequencies being used as a guard band in said legacy radio communication system.

6. Method according to claim 1, wherein said at least one additional subcarrier is added to said legacy carrier such that said extended legacy carrier is symmetric with respect to a center frequency of the legacy carrier.

7. Method according to claim 1, wherein at least one, but less than all, of said at least one additional subcarriers is nulled.

8. Method according to claim 1, wherein all of said at least two OFDM carriers are extended legacy carriers being compatible with said legacy radio communication system.

9. Method as claimed in claim 1, wherein information being related to a configuration of said aggregated carrier being used for the downlink transmission is signaled to or known by a receiver of the downlink transmission in said radio communication system.

10. Method as claimed in claim 1, wherein a baseband equivalent representation of
    said at least one extended legacy carrier or
    an aggregated carrier resulting from the carrier aggregation includes a Direct Current (DC) subcarrier, which DC subcarrier is excluded from transmission.

11. Computer program product comprising a non-transitory computer readable medium, that when executed in a computer, provides computer instructions to:
- allocate frequencies in a spectrum, such that subcarriers of at least two Orthogonal Frequency Division Multiplexing (OFDM) carriers are located separated from each other by a multiple of a subcarrier spacing, and
- synchronize transmission on said at least two OFDM carriers in time, wherein
- at least one of said at least two OFDM carriers is an extended legacy carrier being compatible with a legacy radio communication system, said extended legacy carrier being a legacy carrier of said legacy radio communication system, to which legacy carrier at least one additional subcarrier has been added;
- wherein an aggregated carrier resulting from a carrier aggregation of said at least two OFDM carriers is used for downlink transmission in the radio communication system;
- wherein said at least two OFDM carriers are transmitted from at least two different transmitters;
- wherein, in a handover situation, said at least two OFDM carriers include at least one OFDM carrier being transmitted from a serving cell transmitter and at least one OFDM carrier being transmitted from a target cell transmitter.

12. A transmitter in a radio communication system comprising a downlink transmitter, said downlink transmitter being arranged for assisting in carrier aggregation of at least two Orthogonal Frequency Division Multiplexing (OFDM) carriers, each of said at least two OFDM carriers comprising subcarriers being spaced in accordance with a subcarrier spacing of said radio communication system, respectively, said downlink transmitter comprising:
- an allocation entity, being arranged for assisting in allocation of frequencies in a spectrum, such that the subcarriers of said at least two OFDM carriers are located separated from each other by a multiple of said subcarrier spacing, and
- a synchronization entity, being arranged for assisting in synchronization of transmission on said at least two OFDM carriers in time, and
- a transmission entity, being arranged for assisting in transmission of said at least two OFDM carriers,
- wherein at least one of said at least two OFDM carriers is an extended legacy carrier being compatible with a legacy radio communication system, said extended legacy carrier being a legacy carrier of said legacy radio communication system, to which legacy carrier at least one additional subcarrier has been added;
- wherein an aggregated carrier resulting from the carrier aggregation is used for downlink transmission in the radio communication system;
- wherein said at least two OFDM carriers are from at least two different transmitters;
- wherein, in a handover situation, said at least two OFDM carriers include at least one OFDM carrier from a serving cell transmitter and at least one OFDM carrier from a target cell transmitter.

13. The transmitter according to claim 12, wherein said transmitter is arranged for performing said carrier aggregation by itself, wherein:
- said allocation entity is arranged for allocating frequencies in a spectrum for the subcarriers of all of said at least two OFDM carriers, such that all of said subcarriers are located separated from each other by a multiple of said subcarrier spacing,
- said synchronization entity is arranged for synchronizing transmission on all of said at least two OFDM carriers, and
- said transmission entity is arranged for transmitting all of said at least two OFDM carriers.

14. A radio communication system operating with an aggregated carrier, said aggregated carrier being created by carrier aggregation of at least two Orthogonal Frequency Division Multiplexing (OFDM) carriers in the radio communication system, each of said at least two OFDM carriers comprising subcarriers being spaced in accordance with a subcarrier spacing of said radio communication system, respectively, comprising:
- an allocation entity, being arranged for assisting in allocation of frequencies in a spectrum, such that the subcarriers of said at least two OFDM carriers are located separated from each other by a multiple of said subcarrier spacing, and
- a synchronization entity, being arranged for assisting in synchronization of transmission on said at least two OFDM carriers in time, wherein
- at least one of said at least two OFDM carriers is an extended legacy carrier being compatible with a legacy radio communication system, said extended legacy carrier being a legacy carrier of said legacy radio communication system, to which legacy carrier at least one additional subcarrier has been added;
- wherein an aggregated carrier resulting from the carrier aggregation is used for downlink transmission in the radio communication system;
- wherein said at least two OFDM carriers are transmitted from at least two different transmitters;
- wherein, in a handover situation, said at least two OFDM carriers include at least one OFDM carrier being transmitted from a serving cell transmitter and at least one OFDM carrier being transmitted from a target cell transmitter.

* * * * *